United States Patent
Bril

[19]

[11] Patent Number: 6,005,630

[45] Date of Patent: Dec. 21, 1999

[54] METHOD AND APPARATUS FOR DISPLAYING IMAGES REPRESENTING NETWORK APPLICATION DATA ALONG WITH INTERLACED IMAGES ENCODED IN TELEVISION SIGNALS.

[75] Inventor: Vlad Bril, Campbell, Calif.

[73] Assignee: TeleCruz Technology, Inc., San Jose, Calif.

[21] Appl. No.: 09/244,001

[22] Filed: Feb. 4, 1999

Related U.S. Application Data

[62] Division of application No. 09/001,410, Dec. 31, 1997.

[51] Int. Cl.[6] .................................................. H04N 2/01
[52] U.S. Cl. .......................... 348/446; 348/447; 348/910
[58] Field of Search ................................. 348/446, 447, 348/910, 581, 607, 458

[56] References Cited

U.S. PATENT DOCUMENTS

| | | | |
|---|---|---|---|
| 5,257,348 | 10/1993 | Roskowski et al. | 348/446 |
| 5,327,156 | 7/1994 | Masukane et al. | 348/113 |
| 5,499,039 | 3/1996 | Mistrot | 348/115 |
| 5,510,843 | 4/1996 | Keene et al. | 348/446 |
| 5,781,241 | 7/1998 | Donovan | 348/441 |
| 5,815,208 | 9/1998 | Samela | 348/910 |

*Primary Examiner*—Victor R. Kostak
*Attorney, Agent, or Firm*—Law Firm of Naren Thappeta

[57] ABSTRACT

A television system (TV) with an interlaced display screen for displaying network application data. Pixel data elements representing network application data display are received in a non-interlaced mode. The received data is filtered to reduce sharp transitions in the display. The filtered data is provided in an interlaced format (i.e., only alternate lines of a frame) for display on the television display screen. The interlaced image display is combined with the television signal display by selecting one of them on point by point basis. Flicker is reduced substantially in the final display of network application data due to the filtering.

12 Claims, 7 Drawing Sheets

METHOD AND APPARATUS FOR DISPLAYING IMAGES REPRESENTING NETWORK APPLICATION DATA ALONG WITH INTERLACED IMAGES ENCODED IN TELEVISION SIGNALS.

RELATED APPLICATIONS

This application is a division of application Ser. No. 09/001,410 filed Dec. 31, 1997, pending.

The present application is related to the following co-pending U.S. Patent Applications, which are incorporated by reference in their entirety herewith:
1. Patent application entitled, "A Method and Apparatus for Enabling a User to Access Data Network Applications from a Television System", Filed Jun. 2, 1997, Ser. No. 08/867,203, U.S. Pat. No. 5,946,051 (hereafter "RELATED APPLICATION 1");
2. Patent Application Entitled, "A Circuit and Method for Generating a Clock Signal Synchronized with Time Reference Signals Associated with Television Signals", Filed even date herewith, Ser. No. 09/001,413, and (hereafter "RELATED APPLICATION 2");
3. Patent Application Entitled, "Flicker Filter and Interlacer Implemented in a Television System Displaying Network Application Data", Filed on even date herewith, Ser. No. 09/001,304, and ("RELATED APPLICATION 3"); and
4. Patent Application Entitled,"A Method and Apparatus for Refreshing a Display Screen of a Television System with Images Representing Network Application Data", Filed on even date herewith, Ser. No. 09/001,303, (hereafter "RELATED APPLICATION 4").

BACKGROUND OF THE INVENTION

1. Field of the Invention

The present invention relates to television systems, and more specifically to a method and apparatus for reducing flicker in the combined display of television signals and network application data on a television display screen.

2. Related Art

Since the 1940s, television systems have been increasingly embraced by many households, particularly in the industrial countries. Television systems have generally been used to view broadcasts made in distant parts of the world or to view a pre-recorded program from a video cassette player (VCP). A significant proportion of the households presently have at least one television set in their homes. Television displays are presently available or anticipated to be widely available in analog (e.g., NTSC analog signal displayed on a CRT based display screen) as well as digital technologies (e.g., HDTV).

In parallel, data network applications (hereafter "network applications") have experienced a phenomenal growth since the mid-1980s. Network applications such as web-browsing and electronic mail have had a fundamental impact on the manner in which information is exchanged and disseminated. These network applications have particularly been implemented for and used along with computer systems such as personal computer systems, work-stations, and the like.

At least in view of the considerable presence of the television systems in the households, it may be desirable to provide the capability to access the network applications on television systems. However, there may be several problems which need to be addressed to enable access of data network applications from television systems.

For example, the system may need to be designed to appropriately process the different forms/formats in which the signals of the network applications and television signal are received. As is well known, a television signal may be received in an interlaced format (e.g., composite television signal in NTSC format) and the network application data may be received in a non-interlaced format.

In addition, network application data may be characterized by sharp transitions in color (e.g., the display may include alternative scan lines of black and white). In general, the display of such transitions on television screens results in flicker. As is well known in the art, flicker on television displays is undesirable as it can cause considerable strain on human eyes.

Thus, what is needed is a method and apparatus which can display both the interlaced television signal and the non-interlaced data network application data on a television display screen while reducing or eliminating flicker in the network application data display.

SUMMARY OF THE INVENTION

The present invention is directed to a method and apparatus for displaying network application data along with an image encoded in a television signal on an interlaced display screen of a television system. Flicker (that may otherwise result) is substantially reduced from the network application data display by filtering the pixel data elements as explained below.

A network interface receives network application data (e.g., from web browsing) from an external source. A display controller generates pixel data elements representative of an interlaced image of the network application data display and stores the pixel data elements in a memory module.

The display controller includes a flicker filter and an interlacer in one embodiment of the present invention. The flicker filter receives the pixel data elements from the memory module and filters the received data to generate pixel data elements representing a smoothened image (i.e., an image without sharp transitions). The set of pixel data elements received and the set of pixel data elements generated by the flicker filter represent network application data display in an interlaced format. The term interlaced format refers to all consecutive lines of an image. In contrast, non-interlaced format includes only the alternate lines of an image.

The interlacer receives the pixel data elements of the smoothened image and generates an interlaced image by providing pixel data elements representing alternate lines of the smoothened image. A selection circuit receives the pixel data elements of the interlaced image and an interlaced display signal included in a television signal. The selection circuit selects either the pixel data elements or the interlaced display signal on a point-by-point basis. That is, each point of the image encoded in the television signal is logically mapped to a point on the interlaced display screen. Similarly, each pixel data elements is also mapped to a point on the interlaced display screen. Such mappings allow the selection circuit to select with the television signal image or the network application data image on a point-by-point basis.

In one embodiment of the present invention, the selection circuit includes a digital to analog converter (DAC) which converts each pixel data elements generated by the interlacer into an analog display signal. An analog multiplexor is used to select between each of these analog display signals and the television signal on a point-by-point basis.

An example implementation according to the present invention includes a timing signal generator which controls and coordinates the operation of the memory module, interlacer, flicker filter. The timing signal generator generates a first clock signal and a second clock signal, with the first clock signal having a frequency of twice the second clock signal. The first clock signal is used to drive portions of the embodiment, which operate in non-interlaced mode, i.e., memory module, flicker filter, and input portion of the interlacer. The second clock signal is used to operate the portions of the embodiment which operate in interlaced mode, i.e., the output portion of interlacer and display screen.

The present invention reduces flicker in the network application data display as the pixel data elements representative of the network application data display are filtered. By filtering the data elements, sharp transitions in display are reduced, which results in the elimination of flicker.

The present invention achieves such flicker reduction without requiring substantial additional memory. This is accomplished by accessing data from a memory and performing the flicker reduction operation at twice the clock frequency as that used for providing the interlaced output. By providing data at twice the clock frequency, the present invention enables the flicker filter to have adjacent lines of the image for flicker reduction operation, while providing the output data from the interlacer at a rate required for display on a display screen.

The present invention is particularly suited for interlaced displays as the network application data display is transformed into an interlaced image, which can be easily combined with interlaced images typically present in television signals.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

The present invention is described in the context of a circuit implemented in a television system. In general, conventional television systems receive a television signal in an interlaced format and generate a display based on the received signal. In accordance with the present invention, network application data (such as display resulting from web browsing and having non-interlaced format) is received from an external source, and displayed without much flicker on television display screens displaying interlaced images.

To reduce flicker which may otherwise result in the network application data display, a circuit according to the present invention first receives pixel data elements representative of network application data in a non-interlaced format. As used herein, non-interlaced format of an image refers to all the lines of the image, whereas interlaced format refers to alternate lines of the image. The circuit filters the received pixel data elements using consecutive lines of the non-interlaced image to remove sharp transitions, and generates an interlaced image by providing alternate lines of the interlaced filtered image. The interlaced image of the network application data is then combined with an interlaced image encoded in a television signal. The final image generated by such combining can have portions of network application data display and television signal display as desired by a user.

As the data representing the image is filtered using adjacent lines of the non-interlaced image, sharp transitions are removed from the final image. As a result, flicker is substantially eliminated. To appreciate the present invention, it is helpful to understand the problems that may be encountered with an example embodiment, which may not incorporate one or more aspects of the present invention. Accordingly, one such example embodiment will be described first, followed by the present invention in detail.

Figure 7:
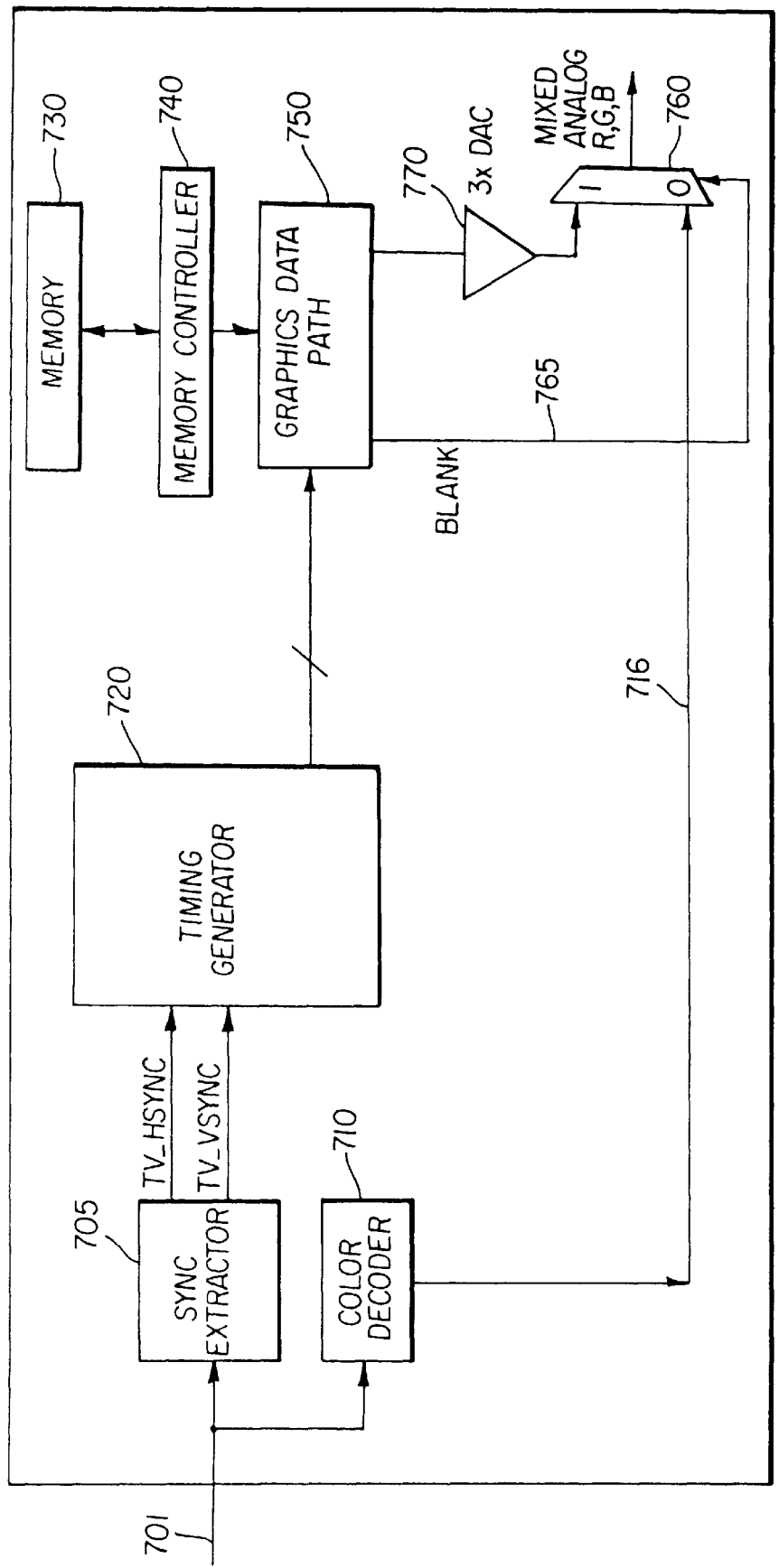
FIG. 7 is a block diagram of a television system illustrating the problems which may be encountered without implementing one or more features of the present invention.

2. An Embodiment Which Does not Incorporate One or More Aspects of the Invention FIG. 7 is a block diagram of a television system 700 illustrating some problems which may be encountered by not employing one or more aspects of the present invention. Television system 700 includes sync extractor 705, color decoder 710, timing generator 720, memory 730, memory controller 740, graphics data path 750, and multiplexor 760. As will be described below, unlike the present invention, all the components of television system 700 operate in an interlaced mode while combining the display corresponding to the data stored in memory 730 with the image represented by a television signal.

Sync extractor 705 and color decoder 710 receive a television signal (e.g., composite video signal) on line 701. Sync extractor 705 extracts the synchronization signals (e.g., tv_hsync and tv_vsync) and provides the signals to timing generator 720. Color decoder 710 extracts a display signal portion representing an image encoded in the received television signal. The display signal portion is provided to multiplexor 760. One of several products available in the market can be used for sync extractor 705 and color decoder 710.

Timing generator 720 receives the television synchronization signals (tv_hsync and tv_vsync) and generates the timing signals (ICDE and 1VCLK) to graphics data path 750. The timing signals operate to coordinate the operation of graphics data path 750 with the received television signal. Specifically, graphics data path 750 uses the timing signals to match each point on the image encoded in the television signal with each point of the image represented by the data stored in memory 730.

Memory 730 stores the data, the display of which is combined with the television signal. display. Memory controller 740 retrieves the data from memory 730 according to the memory access requests received from graphics data path 750. The operation of graphics data path 750 is explained below.

Graphics data path 750 receives the timing signals ICDE (interlaced composited display enable) and 1 VCLK from timing generator 720. The 1 VCLK signal is used by graphics data path 750 to operate the internal pipeline(s). The pipeline may perform functions such as determining whether to display the image encoded in the received television signal or the image represented by the data stored in memory 730 on a point-by-point basis. The blank signal 765 indicates whether to display the television signal or the data. The pipelines may perform other functions such as converting the memory data received at a memory-word width of memory 730 to a pixel element format representative of points of an image.

Notably, graphics data path 750 operates entirely in interlaced format. That is, graphics data path 750 receives data from memory 730 in an interlaced format (i.e., alternate lines of a network application data display frame). The data is retrieved in an interlaced format from memory 730 such that the retrieved data corresponds to the point of the television signal image when both are received at multiplexor 760. Graphics data path 750 generates as output a blank signal to indicate whether to display the television signal image or the data image. If data image is to be displayed, graphics data path 750 generates as output pixel data elements which result from processing the received data.

Digital to analog converter (DAC) 770 receives the pixel data elements from graphics data path 750 and generates analog signals (e.g., in RGB format) therefrom. The analog signals generated from the data stored in memory 730 is provided to multiplexor 760. Multiplexor 760 selects either analog signal received from DAC 770 or the television display signal received from color decoder 710 according to the value on the blank signal 765. The selection results in combining the television signal display with the data display. The output of multiplexor 760 is used to generate display signals on a television screen.

One problem with the above system is that considerable flicker may be present in the data display portion should there be sharp transitions in the display. To avoid such undesirable flicker, the data design (e.g., font bit maps or palettes) in memory 730 may be chosen such that sharp transitions are not present. Unfortunately, such a system may not be adequate when the data is received from external sources such as web browsing because the data can be with several sharp transitions. In addition, as the data is retrieved in an interlaced format, data for adjacent lines may not be present for achieving effective filtering which may reduce filter.

As will be explained below, the present invention overcomes these problems by first retrieving the data in a non-interlaced format so that adjacent lines are available for performing effective filtering. After filtering the data, the resulting filtered data is provided in an interlaced format suitable for display on a television screen.

3. The present invention

Figure 2:
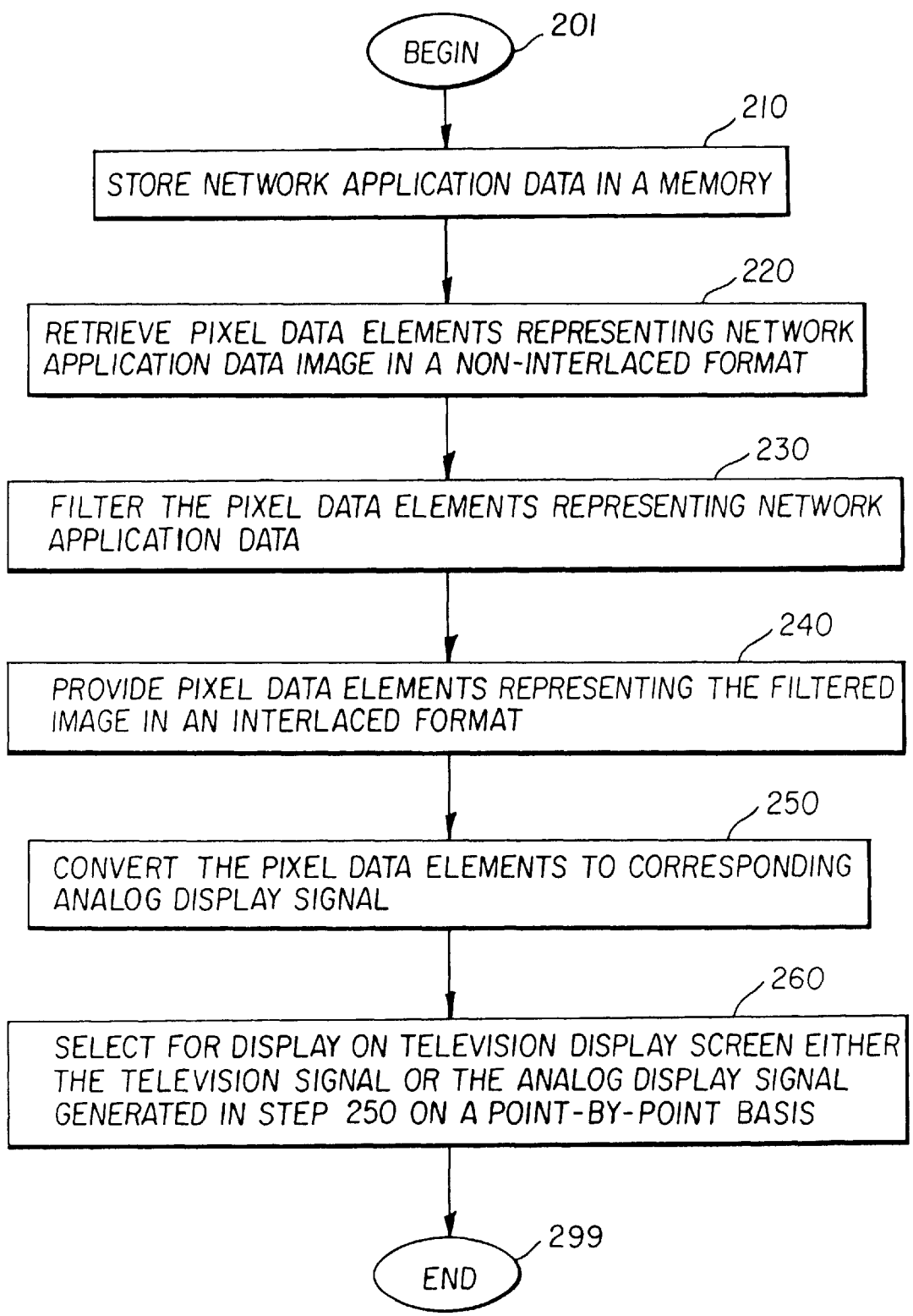
FIG. 2 is a flow-chart illustrating the steps performed in accordance with the present invention.

The present invention is explained with reference to the flow-chart of FIG. 2, which illustrates the steps performed in displaying network application data and television signal on a television screen. In step 210, network application data is stored in a memory. The data can be stored in any format, including but not limited to, text, bit-maps, HTML, VRML etc.

In step 220, pixel data elements representing network application data in a non-interlaced format are received. The conversion of network application data into pixel data elements can be performed either before storing in the memory or after retrieving network application data from the memory. The pixel data elements together represent an image corresponding to the display of network application data.

In step 230, the pixel data elements representing network application data are filtered. Filtering has the general effect of smoothing out the image (by eliminating or reducing sharp transitions) corresponding to network application data. As a result of smoothing, flicker may be reduced from network application data display. It may be noted that at the time of filtering, the network application data is represented in non-interlaced format. That is, filtering is based on a complete image representing network application data.

In step 240, the pixel data elements of the alternate image lines of the filtered image are provided for subsequent processing. Each set of alternate lines represents an interlaced frame. Odd and even lines may be provided alternatively. Thus, the filtered image is provided in an interlaced format for subsequent processing.

In step 250, each pixel data element of the interlaced image is converted to a corresponding analog signal. In step 260, the television display signal and the analog signals representing the pixel data elements in interlaced format are received. One of the two signals is selected for display on a interlaced television display screen. The selection can be done on a pixel-by-pixel basis. That is, the image of each display entity can be logically mapped to a point on the television display screen, and a pixel data element of one of the two display entities can be selected.

Thus, by providing the non-interlaced image of network application data as interlaced frames, the present invention enables the display to be selected on a point-by-point basis. In addition, as the network application data image is filtered, flicker may be avoided in network application display. Also, as the network application data is retrieved in a non-interlaced mode (progressive scan mode), large memories can be avoided for the filtering processing while using several adjacent lines.

The present invention will now be explained in further detail with reference to one or more example embodiments.

4. Example Environment

In a broad sense, the present invention can be implemented in any television system. For purposes of illustration, the invention will be explained in the context of a television system implemented using analog (e.g., using CRTs) technology. However, it will be apparent to one skilled in the art how to implement the present invention with digital technologies (e.g., HDTV supporting interlaced format) without departing from the scope and spirit of the present invention by reading the description herein.

Figure 1:
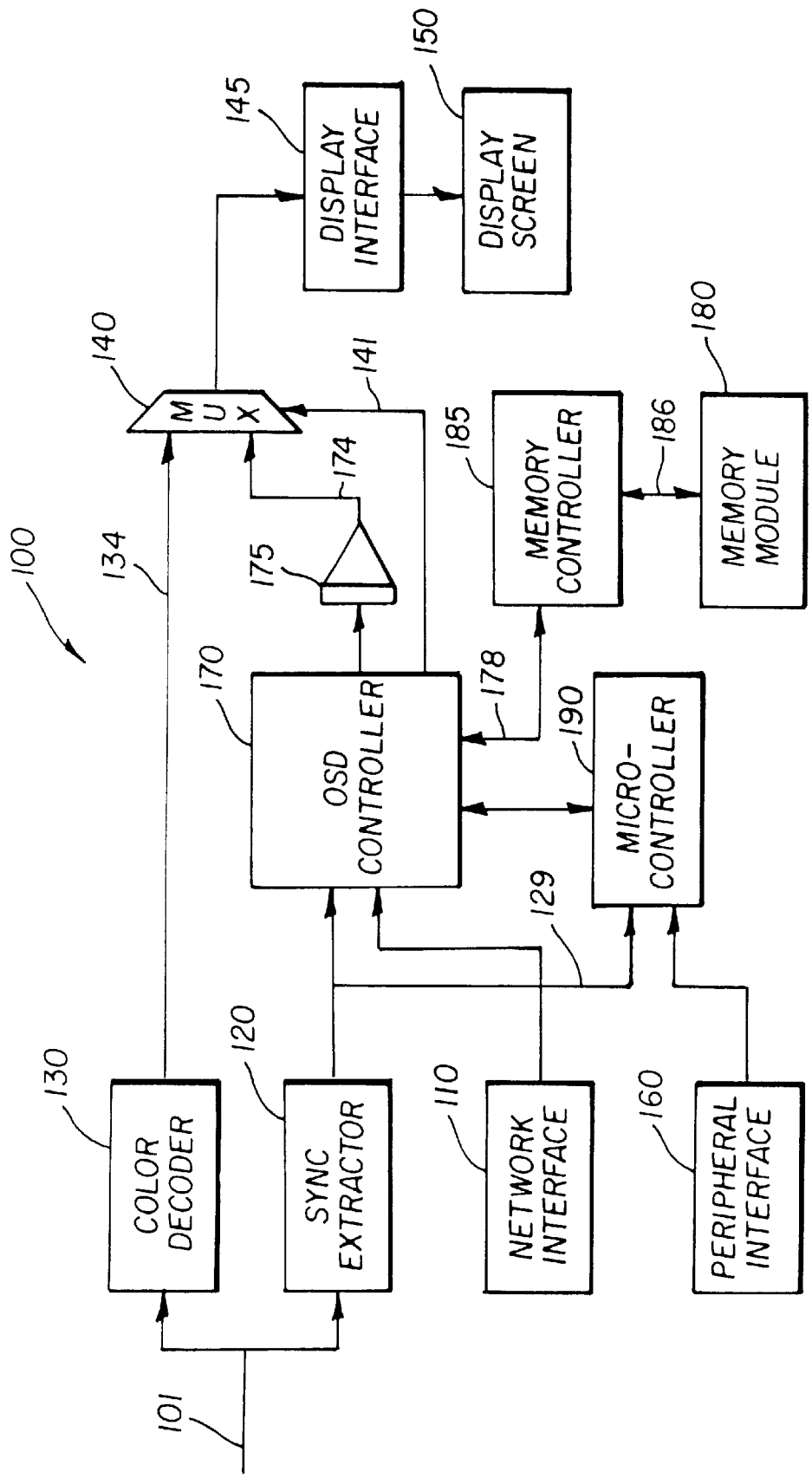
FIG. 1 is a block diagram illustrating an example implementation of a television system in accordance with the present invention.

FIG. 1 is a block diagram of an example television system (TV) 100 in which the present invention can be implemented. The operation, structure and use of television system 100 as relevant to the present invention will be explained here. However, an embodiment of television system 100 is explained in further detail in RELATED APPLICATION 1.

Television system 100 comprises sync extractor 120, color decoder 130, multiplexor 140, display interface 145, display screen 150, peripheral interface 160, on-screen-display (OSD) controller 170, digital-to-analog converter (DAC) 175, memory controller 185, memory module 180, and micro-controller 190. Micro-controller 190 generates control and clocking signals to coordinate and control the operation of the remaining components of television system 100. For purpose of clarity, only some of the connections from micro-controller 190 are shown in FIG. 1. Each of the components of TV 100 are explained in further detail below.

Network interface 110 receives network application data from an external source. Network interface 110 can be a telephone modem, cable modem or any other interface which is designed to operate with the external source. The external source can be, for example, a dialup connection (point-to-point) or a network connection implemented using a communication protocol. Even though network interface 110 is shown as a single block, it should be understood that it may contain more than one unit depending on the specific requirements of the individual television system.

Network interface 110 receives data corresponding to a network application such as web-browsing, electronic mail in a known way. The data may be received in one of known formats such as ASCII, HTML, VRML etc. which are encoded as electrical signals. Network interface 110 sends signals representative of the network application data to OSD Controller 170.

OSD Controller 170 receives network application data from network interface 1 10, and stores the received data in memory module 180 by interfacing with memory controller 185.

Memory module 180 may include one or more physical memory units as suitable for the specific requirements for which TV 100 is designed for. Memory controller 185 interfaces with OSD controller 170, and enables OSD controller 170 to store and retrieve data from memory module 180. The implementation of memory controller 185 depends on the specific technology chosen for memory module 180, and can be provided integral to a memory storage unit. Some features of an embodiment of memory controller 185 are described in RELATED APPLICATION 4.

OSD Controller 180 transforms the network application data as is suitable for storage and retrieval from memory module 180. The storage scheme may include conventions to represent the area on which network application data is to be displayed. In one example embodiment, OSD controller 180 stores the network application data as a "bit map" encoded in RGB format in memory module 180 as illustrated with reference to FIGS. 3A and 3B, which are explained in further detail below.

OSD controller 170 may be designed to store other display entities as well. These display entities may provide additional capabilities or enhance the ease of use of television system 100. However these other display entities will not be described here as they may not be relevant to an understanding of the present invention. For the purpose of explaining the present invention, it will be assumed that OSD controller 170 stores only network application data in memory module 180. For details of other display entities which may be stored in memory module and the manner in which they are used, the reader is referred to RELATED APPLICATION 1.

Also, OSD controller 180 receives pixel elements of network application data image in a non-interlaced format from memory controller 185, but provides pixel elements corresponding to an image of an interlaced format. This conversion simplifies the overlay process between the television signal display and network application data display.

In addition, OSD controller 180 filters the pixel data elements received to smooth out the network application data image. The pixel data elements representing the smoothened image (i.e., without sharp transitions) is provided in the interlaced format. The manner in which the filtering and interlacing is performed in an embodiment is described in detail below and in RELATED APPLICATION 3.

Digital-to-analog converter (DAC) 175 receives the pixel data elements representing the smoothened image from OSD controller 170 and generates analog display signals on line 174 from the pixel data elements. Each pixel data element typically represents the color of a point on display screen 150 when line 141 indicates that network application data is to be displayed.

Sync extractor 120 and color decoder 130 receive a television signal from sources such as cable service providers, television (relay) stations, digital video disk players etc. The TV signal is generally received in a known format, for example, in NTSC composite video format. However, television signal can be any other signal including an interlaced display signal and corresponding synchronization signals. Decoder 130 extracts the interlaced display signal which is encoded in the television signal and provides the display signal to multiplexer 140 on display signal line 134.

Sync extractor 120 extracts (or generates) synchronization signals present in the television signal in a known way. The synchronization signals are provided to micro-controller 190 and OSD controller 170 to coordinate the network application data flow consistent with the reception of the television signal. In one embodiment (described in RELATED APPLICATION 2), the clock signal driving the OSD controller 170 are genlocked to the synchronization signals.

Multiplexor 140 receives the interlaced television signal and the analog display signals as inputs on lines 134 and 174 respectively, and selectively forwards one of the two inputs to display panel interface 145 under the control of select line 141. The select line is controlled by OSD controller 170 in one embodiment. As the two signals received on lines 134 and 174 correspond to the same point on display screen, the selection is performed on a point-by-point basis. The selection results in an overlay. Thus, the television signal display and network application data display are overlayed before a unified display is provided on display screen 150. From the description herein, it will be apparent that multiplexor 140 along with OSD controller 170 form a selection circuit to overlay the display entities displayed by television 100. In one embodiment, select line 141 is controlled by OSD Controller 170 and each multiplexor input corresponds to a single pixel on display screen 150.

Multiplexor 140 along with select line 141 operates to select between the television signal and the pixel data received on line 14. Even though the processing of television signal and network application data is explained with reference to RGB data, it should be understood that the present invention can be implemented using other data formats also without departing from the scope and spirit of the present invention.

In the description above, multiplexor 140 and DAC 175 operate as a selection circuit. The selection circuit operates in an analog domain in the sense that the inputs to multiplexor 140 are in the form of analog signals. However, it should be understood that the selection can be performed in a digital domain as well without departing from the scope and spirit from the present invention. Such a digital operation is described in RELATED APPLICATION 1.

Display interface 145 receives display signals from multiplexor 140, and provides any signaling interface required for display on display screen 150. If display screen 150 is implemented as a CRT screen, display interface 145 generates electrical signals to control the scan circuitry usually associated with CRT screens. The design and implementation of display interface 145 depends on the specific technology chosen for display screen 150. The implementation of display interface 145 will be apparent to one skilled in the art. It is contemplated that the present invention can be implemented with technologies such as digital television systems (e.g., HDTV) and flat-panel based TVs, projection TVs based on DMD (digital mirror display) and the like.

Micro-controller 190 receives these synchronization signals on line 129 and configures the remaining components based on the synchronization signals. For example, micro-controller 190 causes the creation of bit-maps corresponding to the received network application data. In addition, micro-controller 190 ensures that the pixel data elements received on lines 134 (for television signal) and 178 (the overlayed image of display entities stored in memory module 180) correspond to the same point/pixel on display screen 150.

Peripheral interface 160 can include an interface for one or more peripherals. In one embodiment, interfaces are provided for push-buttons and infra-red remote. Push-buttons can be found on conventional television sets, and are generally used for functions such turning the television set ON/OFF, volume control etc. Infra-red remote interface operates in conjunction with remote control devices, which may be used for several functions such as television control (tuning, voice control, remote control etc.), enabling network applications etc. Devices such as key-boards which facilitate easy entry of ASCII data can be interfaced using infra-red interfaces. The implementation of these interfaces will be apparent to one skilled in the relevant arts based on the disclosure provided herein.

Thus, in one embodiment, OSD controller 170 of the present invention retrieves the network application data from memory module 180 in a non-interlaced format, filters the received data to smoothen the image represented by the application data, and provides data representative of the smoothened image in an interlaced format. The data is converted into analog display signals. Multiplexor 140 selects either the analog display signals of network application data or television display signal for each point on the display screen. The selected signal is displayed on the corresponding point.

5. Storage in Memory Module in an Example Implementation

Figure 3A:
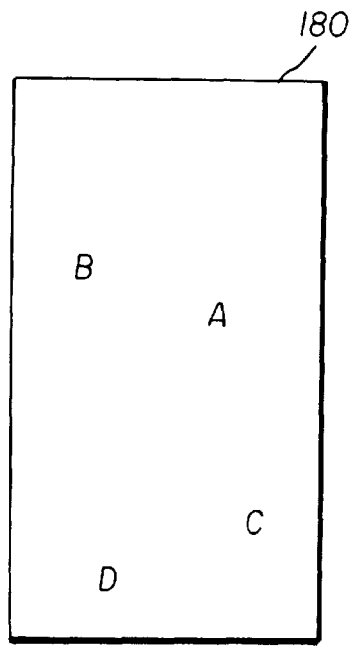
FIG. 3A is a block diagram illustrating an example display of network application data on a television display screen.

In an example implementation, network application data is stored in memory module 180 according to the display sought on display screen 150. Typically, a user specifies the portion on display screen 150 on which network application data is to be displayed and the portion on which television signal is to be displayed. Micro-controller 190 generates commands to store network application data in memory module to correspond to the user specification. Data is stored in memory module according to these commands. OSD controller 170 is designed to receive this data and generate a display in the area specified by the user. FIG. 3A illustrates the data format stored corresponding to a desired display illustrated in FIG. 3B. The structure and operation of OSD controller 170 which uses the data format will then be explained with reference to FIG. 4.

Figure 3B:
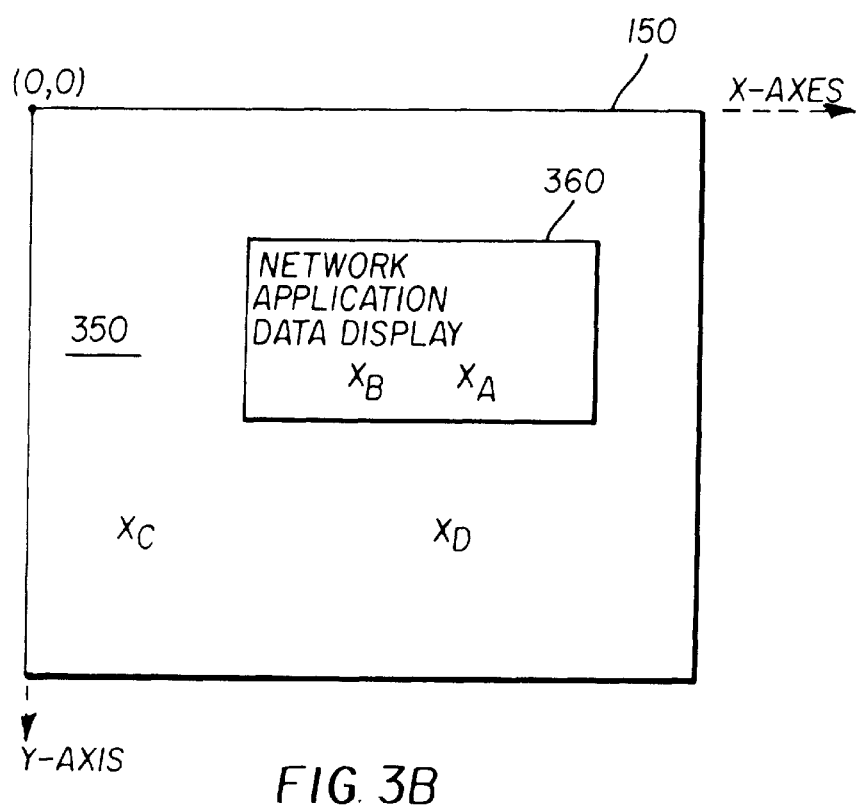
FIG. 3B is a block diagram of a memory module illustrating an example scheme for storing pixel data elements representative of network application data for display on a television display screen of FIG. 3A.

In FIG. 3B, network application data display 360 is shown on a portion of display screen 150. Network application data display 360 can occupy all the surface of display screen 150 if so specified by a user. If network application data display 360 does not occupy the whole surface of display screen 150, television signal display 350 can occupy the area outside of the network application data display 360. The displays shown in FIG. 3B are examples only. The television signal display and network data application can be combined in various ways, for example, as specified by a user. Some of the ways in which the display can be combined is explained in further detail in RELATED APPLICATION 1.

FIG. 3B includes points A, B, C, D which illustrates in combination with FIG. 3A one convention according to which network application data is represented in memory module 180. The stored data defines the manner in which network application data display is to be combined with television signal display. In FIG. 3A, memory module 180 is shown storing a bit map, with each bit position corresponding to a point on the display screen 150. The bit map can be stored as a surface, with each bit having a coordinate position. Each frame of the television signal also can be viewed as a surface with the same coordinate positions for like relative position in the surface. Thus, left right corner of display screen 150 is shown with X, Y coordinates of (0, 0).

Each bit/point/pixel stored in display memory can generally have a value to represent the display signals to be generated. In one embodiment, each point of the display is represented in pelletized 8 bits per pixel format. That is, the eight bits are latter mapped to a color (preferably in OSD controller 170 of FIG. 1).

Continuing with the description of FIGS. 3A and 3B, point values A, B, C, and D stored in memory 180 correspond to points A, B, C, D of FIG. 3B. Each value (pixel data element) stored in memory 180 is set to a value representing the color with which a corresponding point is to be displayed. However, if a television signal is to be displayed at the corresponding point, the value is set to a special value, termed transparent color. Thus, values corresponding to points C and D (on which the television signal is displayed) of FIG. 3B are set to the transparent color. These values can be set according to the area in which a user desires to have the network application data displayed.

The manner in which an implementation of OSD controller 170 uses the above convention to combine the network application data display with the television signal display is explained in detail below and in RELATED APPLICATION 1. The manner in which OSD controller 170 generates filtered interlaced displays in an embodiment of the present invention will be described below.

6. Example Implementation of OSD Controller

Figure 4:
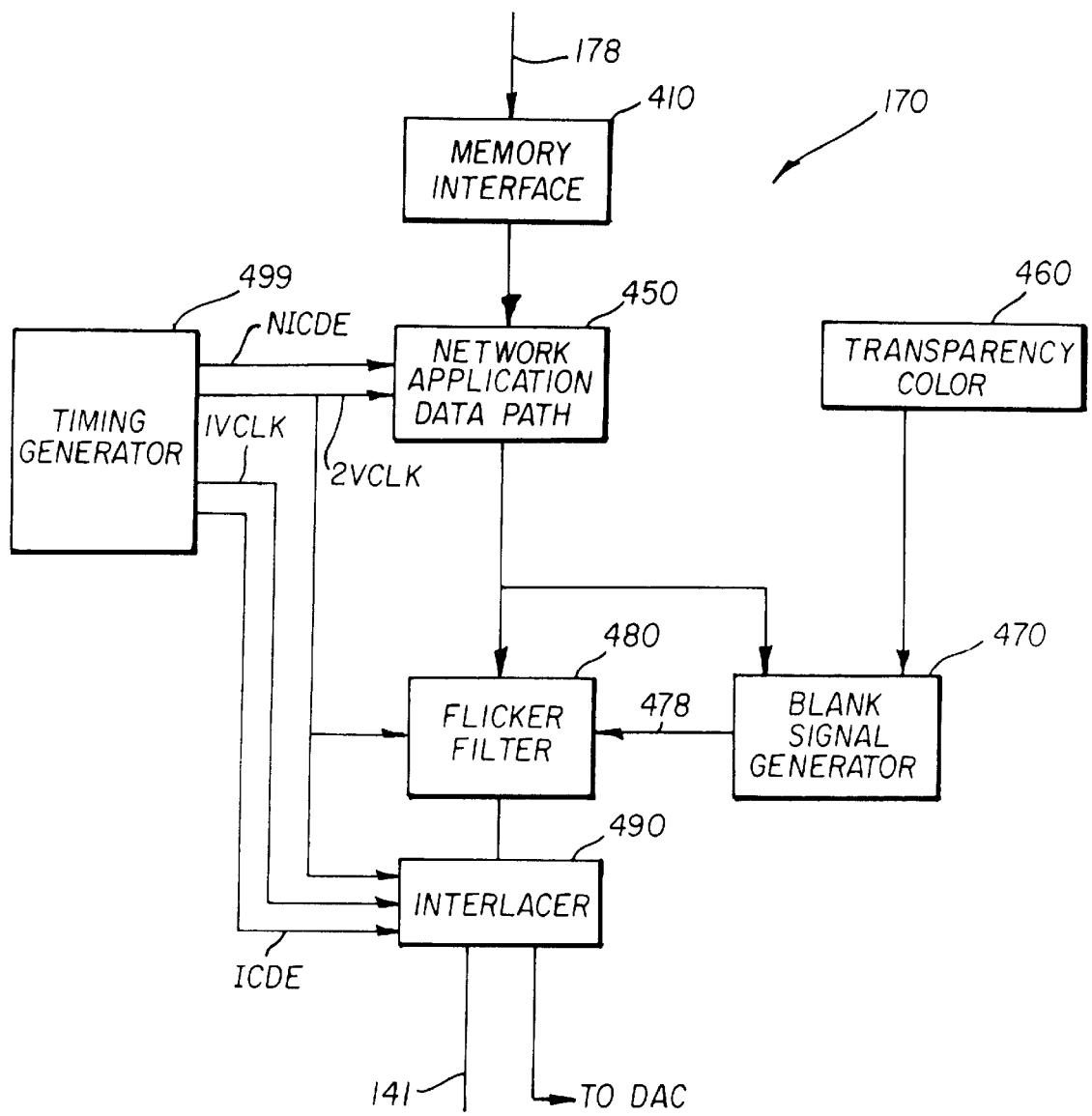
FIG. 4 is a block diagram of an example implementation of a on-screen display (OSD) controller illustrating the manner in which filtered data is provided in an interlaced format.

FIG. 4 is a block diagram illustrating an example implementation of OSD controller 170 comprising memory interface 410, transparency register 460, network application data path 450, blank signal generator 470, flicker filter 480, interlacer 490, and timing generator 499. If other display entities are stored in memory module 180, OSD controller 170 can include other components to process these other display entities. An example implementation processing such display entities is described in RELATED APPLICATION 1.

Memory interface 410 is designed to have the electrical and other protocol functions to interact with memory controller 185 and to provide the pixel data elements to data path 450. The output of memory interface 410 is coupled to the input of network application data path 450. Blank generator 470 and flicker filter 480 are coupled to the output of network application data path 450. Blank generator 470 is coupled to transparent color register 460. Interlacer 490 is coupled to the output of flicker filter 480. Timing generator 499 is coupled to all the other components of OSD controller 170, but only some of the connections are shown for clarity.

The operation of the components of OSD controller 170 can be appreciated by a broad understanding of the speeds at which the components operate. Broadly, network application data path 450 and flicker filter 480 are clocked to operate at high speed so as to generate all the pixel data elements representing a non-interlaced image. Interlacer 490 receives the pixel data elements at the high speed, but provides as output smaller set of pixel data elements representing an interlaced image. That is, during one frame of the television signal, pixel data elements representing all the odd lines are provided, and during an immediate frame, pixel data elements representing all the even lines are provided. Accordingly, the higher speed clock signal 2VCLK is shown connected to network application data path 450, flicker filter 480, and interlacer 490. The slower speed clock 1VCLK is shown connected to interlacer 490 only.

The individual components of OSD controller 170 are explained now in detail.

Data is received by network application data path 450, typically in response to commands from micro-controller 190 to memory controller 185. The commands include operations to store and retrieve data from memory module 180. Memory controller 190 can execute programs defined by data retrieved as a result of execution of the commands. Some of the retrieved commands cause data to be transferred to data path 450, and the transferred data may correspond to the pallette data stored in the respective data paths. The pallette data may be stored in another ROM (not shown).

The store commands cause data to be stored in memory module 180. Such data is typically stored to modify (or define) a corresponding surface. For example, if television 100 receives additional network data from an external source, the received data may be stored in memory module 180, preferably as a bit map. Continuing with the description of memory interface 410 with reference to FIG. 4, memory interface 410 retrieves pixel data elements upon receiving commands from network application data path 450. Each retrieved pixel data element corresponds to a specific pixel position on display screen 150.

Network application data path 450 receives multiple pixel data elements in each word from memory interface 410. Network application data path 450 then performs steps such as serialization to extract each pixel data element from the received word. For example, if network application data is encoded in 8 bpp format and if each received word includes 16 bits of pixel data, network application data path 440 serializes the 16 bits into two pixel data elements.

Network application data path 440 may further include a palette table to convert the 8 bits of pixel data into color data with more number of bits in a known way. For example, each pixel data element may be mapped into 5:6:5 or 6:6:6 RGB data. The pallette table in turn may be loaded (from an external ROM, not shown) by appropriate data in response to commands from micro-controller 190.

Network application data path 440 is shown operating using two clock signals 2VLCK and NICDE (non-interlaced composite display enable). The 2VCLK signal indicates that it operates at twice the frequency as the 1VCLK shown connected to interlacer 490. With the higher speed (frequency), the 2VLCK causes network application data path 440 to operate with pixel data elements representing images in a non-interlaced format. The NICDE signal indicates the correct time for network application data path 440 to start the pipelines and continue processing the pixel data elements. The pixel data elements are provided to interlacer 490 as a result of such processing. The pipelines in network application data path 440 are operated such that there is adequate data flow to interlacer 490.

Blank signal generator 470 generates a blank signal. In one embodiment, blank signal generator 470 comprises a comparator, which compares the output of network application data path 450 with a transparency color stored in the programmable register 460. The output of the comparator is provided to multiplexor 140 on line 141. Thus, if the two input values to the comparator are detected to be equal, the blank signal is asserted, which causes multiplexor 140 to select the data provided by OSD controller on line 174. Otherwise, multiplexor 140 selects the television signal data received from encoder 130.

In one embodiment, blank generator 470 provides the blank signal to flicker filter 480 on bus 478. In turn, flicker filter 480 stores and/or transfers data bits representative of these signals correlated with the pixel data received from data path 450. Such a correlation allows OSD controller 170 to appropriately process corresponding portion (point) of television signal received in another path. In alternative embodiments, the blank signals can be provided directly to the selection circuit.

Flicker filter 480 can filter the received pixel data element in one of several ways. The received pixel data elements shall be referred to as 'original pixel data elements' and the pixel data elements resulting from the filtering operation shall be referred to as 'filtered pixel data elements'. An example embodiment of flicker filter 480 is described in detail in RELATED APPLICATION 3. Filtering generally has the effect of smoothing the image eventually displayed. As a result of image smoothing, flicker may be reduced in the display of network application data on display screen 150. In one embodiment, flicker filter 480 includes a buffer to store two or more lines of data. However, a different number of lines can be stored and used during filtering as will be apparent to one skilled in the relevant arts by reading the description provided herein.

Filtering may be performed relative to both previous lines and/or subsequent lines. In general, the data (corresponding to the adjacent lines) stored in the buffer are processed to remove (reduce) sharp transitions. For example, the a pixel data elements may be interpolated with adjacent pixel data elements to generate the filtered pixel data elements. These filtered pixel data elements are used for generating display signals as explained below. Also, flicker filter 480 also operates using 2VLCK signal to be able to process the larger number of pixel data elements present in the non-interlaced image. It should be noted that a new pixel data value is typically generated by the operation of flicker filter 480. Accordingly, the blank signal is generated before pixel data elements are processed by flicker filter 480.

Interlacer 490 receives pixel data elements representing a non-interlaced image from flicker filter 480, and provides as output alternate lines representing an interlaced image. Odd lines and even lines can generally be provided alternately. Each set of such alternate lines may be referred to as an interlaced frame. The conversion is performed as display screen 150 is designed to display an interlaced image. An embodiment of interlacer 490 which is integrated into the architecture of flicker filter 480 is described in further detail in RELATED APPLICATION 3.

The operation of interlacer 490 can be controlled by the timing signals generator 499. Specifically, ICDE (interlaced composite display enable), 2VCLK and 1VCLK signals are shown in FIG. 4 from time signals generator 499 to interlacer 490. 2VCLK signal is generated at twice the frequency of 1VCLK signal. 2VLCK signal enables interlacer 490 to receive the pixel data elements representative of the image in an non-interlaced format. 1VLCK signal enables interlacer 490 to generate pixel data elements representative of the same image in the interlaced format. ICDE is timed to cause interlacer 490 to generate each pixel data element which corresponds to a point represented by the television display signal portion received at multiplexor 140. As noted earlier, multiplexor 140 can select one of the two signals, which results in combining of the television signal image and network application data image. Several implementations of interlacer 490 will be apparent to one skilled in the art by reading the description provided herein.

The output of interlacer 490 is provided as an input to multiplexor 140 on line 174. As will be apparent from the description above, the output of interlacer 490 represents the network application data image in an interlaced format. In addition, the blank signal generated by data path multiplexor 460 is provided on signal line 141. One value of blank signal causes multiplexor 140 to select the television signal pixel data element received from encoder 130, and the other value of the blank signal line causes multiplexor 140 to select the pixel data element received from interlacer 490. Thus, the blank signal determines whether the television signal image or the network application data image is displayed on a pixel-by-pixel basis.

Timing signals generator 499 generates the clocking and control signals for different components of OSD controller 170. Timing signals generator 499 receives as input the HSYNC and VSYNC signals from the television signal, and generates the 1VLCK signals and display enable signals described herein. The 1VLCK signals and display enable signals are 'genlocked' to the television signal synchronization signal. Genlocking refers to the synchronization of one signal(s) to the other. It is generally important that the 1VLCK and display enable signals be locked accurately to the HSYNC and VSYNC signals. Without such locking, the network data display may be seen to be moving with respect to the television signal display. Such movement (called jitter) is stressful on the human eye, and thus undesirable. When the signals are genlocked properly, jitters can be minimized (or eliminated). An embodiment for achieving such genlock is described in RELATED APPLICATION 2.

Thus, timing signals generator 499 generates timing signals which are genlocked with synchrnization signals present in the received television signals. These signals are used to generate network application data in a non-interlaced mode. This retrieved data is filtered to smoothen (eliminate sharp transitions) in the network application data image. The data corresponding to the smoothened image is then provided in an interlaced format suitable for display on a interlaced television signal display. An example embodiment of interlacer 490 and the associated timing diagrams are described below in detail.

7. Example Embodiment of Interlacer

Figure 5:
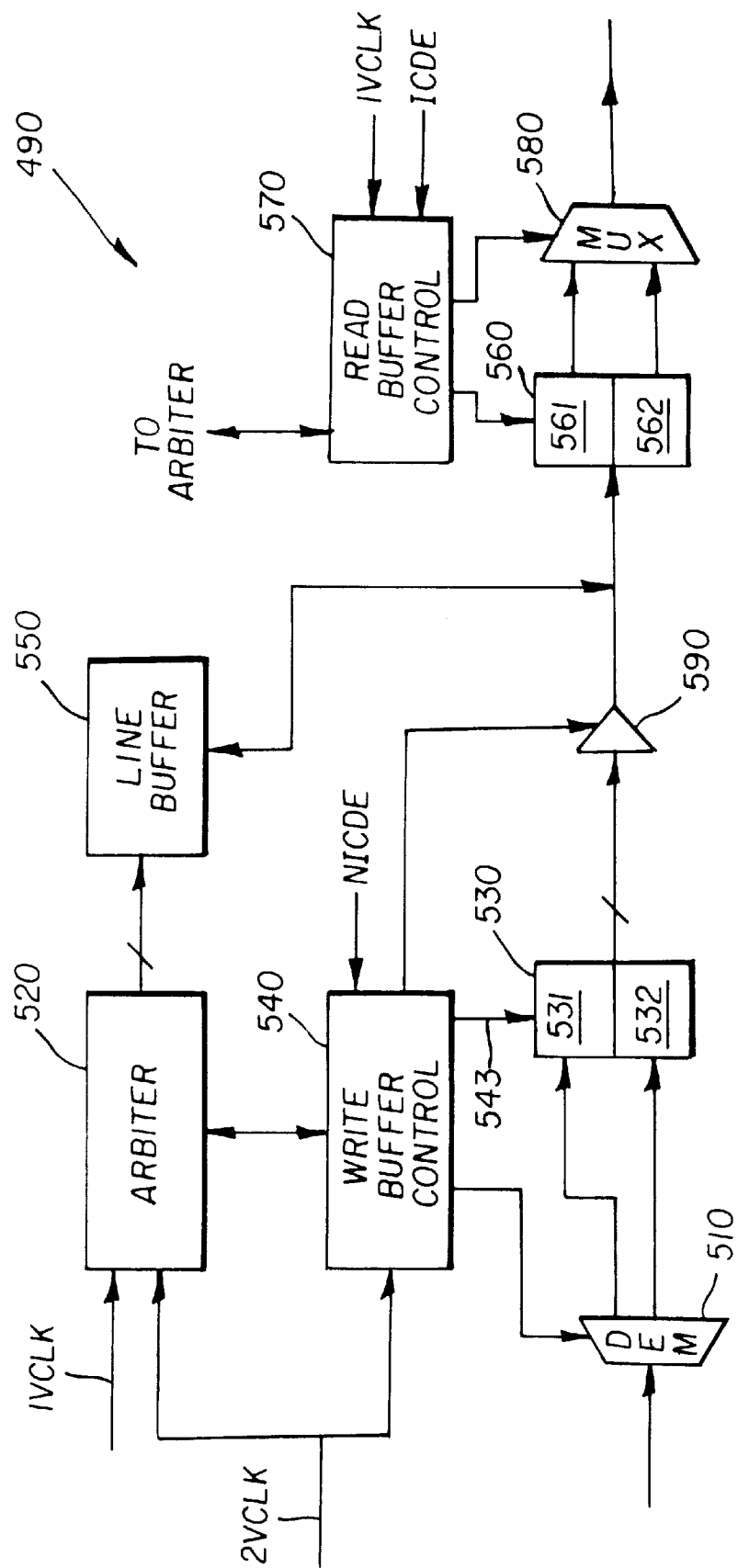
FIG. 5 is a block diagram of an example implementation of an interlacer which generates interlaced image data from non-interlaced image data.

FIG. 5 is a block diagram of interlacer 490 in an example implementation of the present invention. Interlacer 490 comprises demultiplexor 510, arbiter 520, write buffer 530, write buffer control 540, line buffer 550, read buffer 560, read buffer controller 570, demultiplexor 580, and tristate buffer 590. As will be explained, interlacer 490 receives filtered pixel data elements (from flicker filter 480) representing non-interlaced images and generates pixel data elements representing non-interlaced images.

In one embodiment, line buffer 550 is implemented as a random access memory having sufficient storage to store two horizontal lines of pixel data elements. The word width (i.e., number of bits in each word) of line buffer 550 can be chosen to store data for two pixel data elements. As will be clear from the discussion below, such a memory size and word width enables data to be delivered from interlacer 490 at a desired rate while effectively resolving conflicts for reading and writing into line buffer 550. The remaining logic in interlacer 490 is implemented to operate with line buffer 550.

As the data output rate of interlacer 490 is only half that of the input rate when providing interlaced output, read operations can occur at half the frequency as that of write operations. Accordingly, write buffer control 540 and read buffer control 570 are coupled to 2VCLK and 1VCLK signals respectively. In one embodiment, 2VCLK and 1VCLK operate at frequencies of 25 MHZ and 12.5 MHZ respectively.

In addition, NICDE (non-interlaced composite display enable) provides an indication as to the clock cycles during which valid pixel data elements representing the non-interlaced image should be received. Accordingly, write buffer control 540 generates signals on line 543 to enable write-buffer 530 to receive data from demultiplexor 510 as explained below in further detail. Write buffer control 540 sends a write request to arbiter 520 on line 524, which ensures there are no conflicts with read operations to line buffer 550.

As to the write operation into line buffer 550, write buffer 530 comprises two portions 531 and 532, with each portion designed to store a pixel data element. Once stored, the two pixel data elements are forwarded to line buffer 550. In another embodiment, data is stored into and retrieved from line buffer 550 in units of five pixel data elements. Accordingly, write buffer 530 (and read buffer 560) may comprise five portions (instead of the two shown).

Demultiplexor 510 operates to multiplex pixel data elements received from flicker filter 480 into the two portions 531 and 532 under the control of multiplexor selector line 541 asserted by write buffer control 540. Write buffer control 540 generates the control signals to write-buffer 530 and demultiplexor 510 to coordinate and control the respective operations. Write buffer control 540 also drives tri-state buffer 590 to a high-impedance state when data is read from line buffer 550.

As to the read operations, read buffer 560 can include two portions 561 and 562, each for storing a pixel data element. When the first two pixel data elements of a line are available in write buffer 530, the two pixel data elements are directly transferred to read buffer 560. This is done to pre-fill read buffer 560 and keep the first two data pixels ready for display. Subsequent pixels to read buffer 560 are transferred from line buffer 550. Read buffer control 570 generates the control signals to coordinate and control the read operations.

The signals generated by read buffer control 570 further operate to serialize the pixel data elements stored in portions 561 and 562. That is, read buffer control 570 generates appropriate values on signal line 578 to cause one of the two pixel data elements stored in read buffer 560 to be provided as output on line 174. Signal line 578 is asserted such that the earlier pixel data element in the scan order is selected first.

Arbiter 520 arbitrates between read and write requests. Such arbitration may be required to avoid race conditions and as line buffer 550 may be implemented as a single-ported RAM. In general, if there is a conflict, arbiter 520 can provide higher priority to write requests as read transactions are received at lower frequency during interlaced mode of provision of data. Thus, in situations of conflict, read operations may be serviced during an immediately following clock cycle. By having two portions in read buffer 570, starvation may be avoided. That is, data will be provided continuously at a desired rate for generating display.

The operation of the individual components are controlled and coordinated (synchronized) by signals from timing signals generator 499. The relationship between the timing signals in an example embodiment are illustrated with reference to timing diagrams below.

8. Timing Diagrams

Figure 6A:
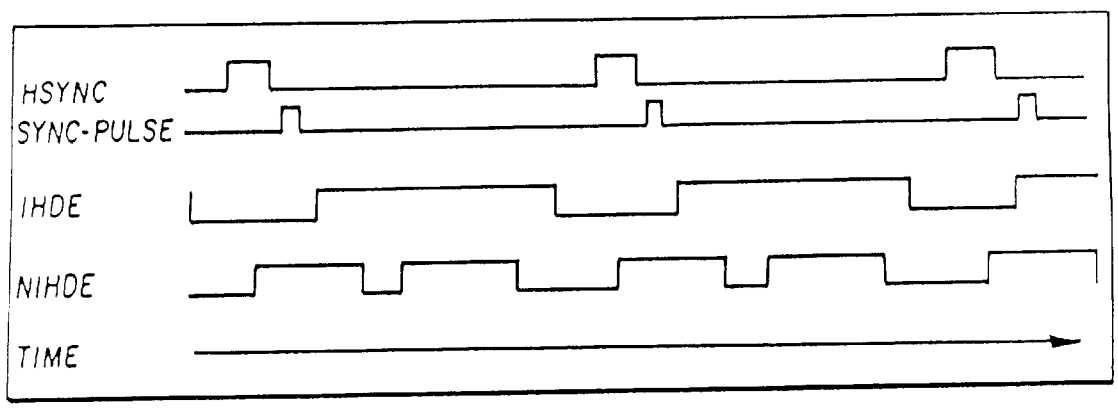
FIGS. 6A and 6B illustrate the timing relationships between various signals that control the operation flow in one embodiment of the present invention.
Figure 6B:
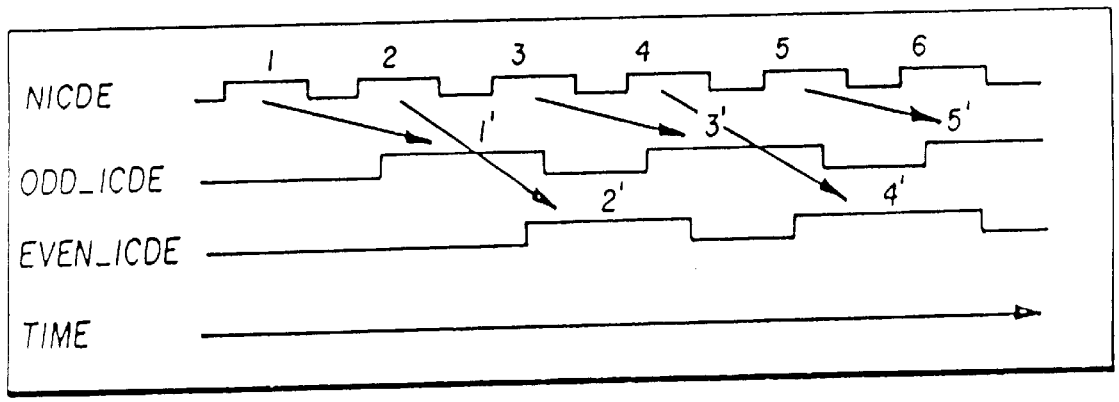

FIGS. 6A and 6B illustrate the timing relationship between various signals that control the operation flow in one embodiment of the present invention. Specifically, FIGS. 6A and 6B respectively illustrate the horizontal and vertical timing relationships. The signals in each Figure are explained in detail below.

With reference to FIG. 6A, HSYNC signal refers to the horizontal synchronization signal extracted from the received composite television signal. SYNC-PULSE is generated in a known-way and is used to genlock the signals including 1VLCK and 2VCLK signals to the trailing edge of HSYNC. IHDE (interlaced horizontal display enable) signal controls the timing of the display of each horizontal line on television display screen 150. NIHDE (non-interlaced horizontal display enable) signal controls the timing of the flow of individual pixel data elements in a horizontal line. Horizontal display enable signals typically indicate the time during which valid data is present for subsequent processing. The NIHDE signal has to be ahead of the IHDE by sufficient VCLK clock cycles such that enough data is already in the interlacer buffer when IHDE starts. VCLK genlocked to HSYNC is used to generate both the waveforms.

With reference to FIG. 6B, NICDE signal controls the flow of data in network application data path 340, flicker filter 480, and interlacer 490 as explained above. The horizontal lines (numbered 1–6) of each frame are processed during each period when the signal is at a logical high. The horizontal lines are referred by numbers 1–6 for illustration. The ICDE signal is represented by odd_ICDE and even_ICDE signals respectively when odd and even frames are processed. As can be appreciated, the pixel data elements generated from interlacer 490 have different values compared to pixel data elements provided as input to flicker filter 480 due to the filtering operation. Accordingly, the lines corresponding to NICDE are shown without prime symbol ('), while the corresponding filtered data is shown with a prime symbol. Also, the CDE signals are generated to ensure that the display signals generated from the pixel data elements are received at a time corresponding to corresponding portions of the television display signal portion at multiplexor 140.

Thus, using these signals, the combined display of network application data and television signal is generated. As all the horizontal lines of the network application data image are used for filtering, sharp transitions are reduced. As a result, flicker may be substantially reduced in the final network application data display on television display screen 150. In addition, as the filtered data is provided in an interlaced format, it is well-suited for display on interlaced displays of display screen 150.

9. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A display circuit implemented in a television system, said television system including an interlaced display screen, said display circuit enabling the display of an image corresponding to network application data along with an image encoded in a television signal, said television signal including an interlaced display signal and a plurality of synchronization signals, said display circuit comprising:

a memory interface for receiving a plurality of pixel data elements representative of a non-interlaced image of said network application data, wherein said plurality of pixel data elements are stored in a memory module;

an interlacer coupled to said memory interface, said interlacer receiving said plurality of pixel data elements representative of a non-interlaced image of said network application data, said interlacer providing a plurality of pixel data elements representative of an interlaced image of said network application data;

a selection circuit for receiving said interlaced display signal and said plurality of pixel data elements representative of said interlaced image of said network application data, said selection circuit generating a plurality of display signals representative of a combined image of said interlaced image of said network application data and said image encoded in said television display signal, wherein said selection circuit generates said plurality of display signals representative of said combined image by selecting either said interlaced display signals or each of said plurality of pixel data elements representative of said interlaced image of said network application data on a point-by-point basis; and a display interface for receiving said plurality of display signals generated by said selection circuit, said display interface causing said combined image to be displayed on said interlaced display screen based on said plurality of display signals generated by said selection circuit.

2. The display circuit of claim 1, further comprising a digital-to-analog converter (DAC) coupled to said memory module and said selection circuit, wherein said DAC converts said pixel data elements stored in said memory module to analog form and provides said pixel data elements in analog form to said selection circuit.

3. The display circuit of claim 2, wherein said selection circuit comprises a multiplexor for receiving the output of said DAC and said interlaced display signal, wherein the output of said multiplexor comprises said plurality of display signals.

4. The display circuit of claim 1, further comprising a color decoder for receiving said television signal, said color decoder for extracting a display signal portion representing said non-interlaced image encoded in said television signal.

5. A method of generating the display of an image corresponding to network application data along with an image encoded in a television signal, said television signal including an interlaced display signal and a plurality of synchronization signals, said display being generated on an interlaced display screen of a television system, said method comprising the steps of:

(a) receiving a plurality of pixel data elements representative of a non-interlaced image of said network application data;

(b) storing said plurality of pixel data elements representative of said non-interlaced image of network application data in a memory module;

(c) generating a plurality of pixel data elements representative of an interlaced image of said network application data from said plurality of pixel data elements representative of a non-interlaced image of said network application data;

(d) selecting either said interlaced display signals or each of said plurality of pixel data elements representative of said interlaced image of said network application data on a point-by-point basis to generate a plurality of display signals representative of a combined image of said interlaced image of said network application data and said image encoded in said television display signal; and (e) displaying said combined image on said interlaced display screen, wherein the display is generated based on said plurality of display signals representative of said combined image.

6. The method of claim 5, wherein the receiving of step (a) is performed by a memory interface storing said plurality of pixel data elements in said memory module.

7. The method of claim 5, wherein said interlaced display signals are received in analog form, said method comprises the further step of converting said plurality of pixel data elements representative of an interlaced image of said network application into analog form such that the selection of step (d) is performed using an analog selection circuit.

8. A display circuit implemented in a television system, said television system including an interlaced display screen, said display circuit enabling the display of an image corresponding to network application data along with an image encoded in a television signal, said television signal including an interlaced display signal and a plurality of synchronization signals, said display circuit comprising:

means for generating a plurality of pixel data elements representative of a non-interlaced image of said network application data;

means for storing said plurality of pixel data elements representative of said non-interlaced image of network application data in a memory module;

means for generating a plurality of pixel data elements representative of an interlaced image of said network application data from said plurality of pixel data elements representative of a non-interlaced image of said network application data;

means for selecting either said interlaced display signals or each of said plurality of pixel data elements representative of said interlaced image of said network application data on a point-by-point basis to generate a plurality of display signals representative of a combined image of said interlaced image of said network application data and said image encoded in said television display signal; and means for displaying said combined image on said interlaced display screen, wherein the display is generated based on said plurality of display signals representative of said combined image.

9. The display circuit of claim 8, further comprising converter means coupled to said memory module and said means for selecting, wherein said means for converting converts said pixel data elements stored in said memory module to analog form and provides said pixel data elements in analog form to said means for selecting.

10. The display circuit of claim 8, wherein said means for selecting comprises a multiplexor means for receiving the output of said means for converting and said interlaced display signal, wherein the output of said multiplexor means comprises said plurality of display signals.

11. The display circuit of claim 8, further comprising a color decoder means for receiving said television signal, said color decoder means for extracting a display signal portion representing said non-interlaced image encoded in said television signal.

12. A display circuit implemented in a television system, said television system including an interlaced display screen, said display circuit enabling the display of an image corresponding to network application data along with an image encoded in a television signal, said television signal including an interlaced display signal and a plurality of synchronization signals, said display circuit comprising:

means for receiving a plurality of pixel data elements representative of a non-interlaced image of said network application data;

means for filtering said plurality of pixel data elements to generate a plurality of pixel data elements representative of a smoothened non-interlaced image;

means for generating an another plurality of pixel data elements representative of an interlaced image, said interlaced image including alternate lines of said smoothened non-interlaced image;

means for selecting either said interlaced display signals or each of said plurality of pixel data elements representative of said interlaced image of said network application data on point-by-point basis to generate a plurality of display signals representative of a combined image of said interlaced image of said network application data and said image encoded in said television display signal; and means for generating said combined image on said interlaced display screen according to said plurality of display signals representative of said combined image.

* * * * *